(No Model.)
J. H. WESTCOTT.
DRILL CHUCK.
No. 315,684. Patented Apr. 14, 1885.
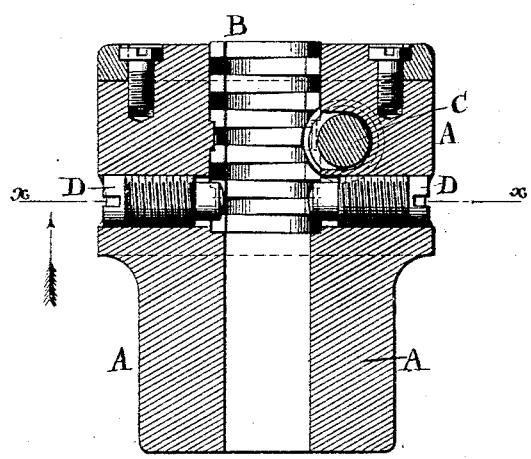
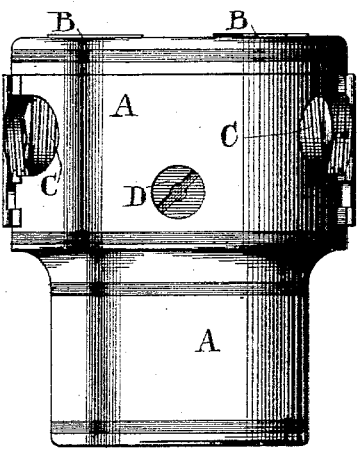
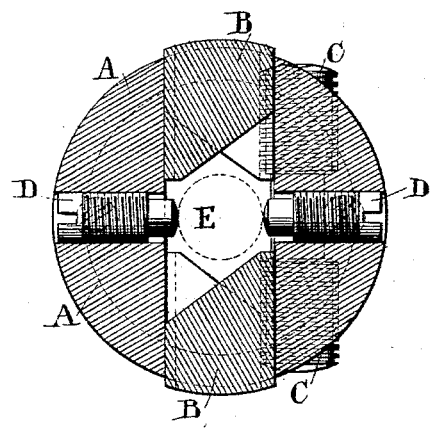
Witnesses:—
Louis M. T. Whitehead
Fred Haynes
Inventor:—
John H. Westcott
by his Attys.
Brown & Hall

UNITED STATES PATENT OFFICE.

JOHN H. WESTCOTT, OF ONEIDA, NEW YORK.

DRILL-CHUCK.

SPECIFICATION forming part of Letters Patent No. 315,684, dated April 14, 1885.

Application filed August 6, 1884. (No model.)

*To all whom it may concern:*

Be it known that I, JOHN H. WESTCOTT, a citizen of the United States, and a resident of Oneida, in the county of Madison and State of New York, have invented a new and useful Improvement in Universal Chucks, of which the following is a specification, reference being had to the accompanying drawings.

The invention is more especially designed for universal drill-chucks, but may be applied to other universal chucks.

It consists, essentially, in the combination, with a chuck having two universally-moving jaws, of set-screws inserted and arranged between said jaws, and made capable of adding to the strength of the grip of said chuck by compressing a drill or other tool or article independently of and between the gripping-surfaces of the jaws of said chuck.

The invention also consists in certain details of construction hereinafter more fully described.

Figure 1 is a side view of an ordinary two-jawed universal chuck with my invention applied to it. Fig. 2 is an axial sectional view of the same. Fig. 3 is a transverse sectional view of the same on the line *x x* of Fig. 2.

A denotes the body of the chuck; B and B, the jaws; and C is the feed-screw, having a right-hand thread at one end and a left-hand thread at the other, fitted, respectively, to right and left hand female threads in adjacent sides of the jaws in a well-known way.

D D designate the set-screws. These screws are fitted to tapped holes in opposite sides of the chuck, so that they will be in line with each other, and when set their points will bind directly opposite to each other midway between the two jaws of the chuck. The heads of these screws are provided with nicks or other proper devices for turning them. Their inner ends are made a little smaller than the body, so that they will pass into a narrower space between the jaws.

To use my invention, the drill E or other tool or article is first set in the chuck and the jaws closed on it by their inward movement produced by the screw C. The screws D and D are then firmly set against the said drill or other tool or article from either side, so that their pressure will add additional strength to the grip of the chuck and assist in preventing the tool or other chucked article from moving in the chuck. When the tool or article is to be taken from the chuck, the screws D and D are first released, and after the jaws are loosened the tool or article can be easily taken out.

What I claim as my invention, and desire to secure by Letters Patent, is—

The combination, with a chuck having universally-moving jaws, of set-screws inserted between said jaws, so that they are capable of binding a drill or other tool or article set in the chuck independently of and between the gripping-surfaces of said chuck, but with an additional gripping action, substantially as and for the purpose herein described.

JOHN H. WESTCOTT.

Witnesses:
C. CARSKADDAN,
E. F. AMENT.